United States Patent [19]

Schweikert et al.

[11] 4,428,343
[45] Jan. 31, 1984

[54] TIP-IN KNOCK ELIMINATING SPARK TIMING CONTROL

[75] Inventors: John F. Schweikert, Sterling Heights; David S. Grossman, Rochester; Edward E. Durham, Utica, all of Mich.

[73] Assignee: General Motors Corporation, Detroit, Mich.

[21] Appl. No.: 323,821

[22] Filed: Nov. 23, 1981

[51] Int. Cl.³ .............................................. F02P 5/04
[52] U.S. Cl. ..................................... 123/425; 123/492
[58] Field of Search ....................... 123/425, 435, 492; 73/35

[56] References Cited

U.S. PATENT DOCUMENTS

| | | |
|---|---|---|
| 2,365,313 | 12/1944 | Udale . |
| 2,384,692 | 9/1945 | Olson et al. . |
| 2,557,527 | 6/1951 | Colvin et al. . |
| 2,596,830 | 5/1952 | Udale . |
| 2,827,889 | 3/1958 | Smitley . |
| 3,007,987 | 11/1961 | Barnes . |
| 3,698,366 | 10/1972 | Grop . |
| 3,828,743 | 8/1974 | Ludwig . |
| 3,935,843 | 2/1976 | Ludwig . |
| 4,054,110 | 10/1977 | Walker et al. . |
| 4,106,447 | 8/1978 | West .................................. 123/425 |
| 4,232,642 | 11/1980 | Yamaguchi et al. . |
| 4,344,400 | 8/1982 | Asano ................................ 123/425 |
| 4,357,918 | 11/1982 | Asano ................................ 123/425 |
| 4,364,353 | 12/1982 | Fiala ................................... 123/435 |
| 4,370,963 | 2/1983 | Iwata et al. ....................... 123/425 |

FOREIGN PATENT DOCUMENTS 55-156260 12/1980 Japan .................................... 123/425

Primary Examiner—Parshotam S. Lall
Attorney, Agent, or Firm—Robert M Sigler

[57] ABSTRACT

A spark timing control system for an internal combustion engine is responsive to a changing engine operating parameter signalling an engine tip-in event to retard spark timing by an amount sufficient to eliminate tip-in knock and for a predetermined time period ending 175–300 milliseconds after initiation of the tip-in event, so that no perceptible engine performance loss results.

2 Claims, 7 Drawing Figures

TIP-IN KNOCK ELIMINATING SPARK TIMING CONTROL

BACKGROUND OF THE INVENTION

This invention relates to spark timing controls for spark ignited internal combustion engines and particularly to such a control which substantially eliminates the phenomenon of tip-in knock. Tip-in knock is that knock or ping which occurs almost immediately upon the sudden opening of the vehicle throttle valve with the resulting sudden increase in pressure within the engine intake manifold. It is a momentary phenomenon and is thus not subject to control by closed loop knock sensing systems, since the knock occurs and often ends before the system can properly react. The result of the application of a closed loop knock control system to tip-in knock mmay thus be that the knock is not eliminated but the spark timing is uselessly and detrimentally retarded after the knock occurs.

The prior art shows awareness of the problem of tip-in knock and is in substantial agreement about a general approach to its elimination. Since it occurs so quickly, it must be anticipated by the sensing of a tip-in event: that is, a sudden increase in throttle opening or pressure within the intake manifold. There are many prior art patent references which show systems effective to sense an engine tip-in event and retard engine spark timing as quickly as possible given the physical limitations of the apparatus disclosed in order to prevent engine knock. Unfortunately, the spark retard has an undesirable effect as well in that it reduces engine power just at the time when that power is most desired: during a vehicle acceleration or sudden increase in engine load. It is, therefore, very noticeable and irritating to the vehicle operator. The problem of obtaining the beneficial tip-in knock eliminating effect of immediate spark retard upon sensing of a tip-in event without the undesirable power loss resulting from that spark retard appears to be unsolved by the prior art.

SUMMARY OF THE INVENTION

It is, therefore, an object of this invention to provide an engine spark timing control system which responds to a sensed engine tip-in event to control spark timing for the elimination of tip-in knock and in such manner that the vehicle operator will be substantially unaware of such action.

It is yet another object of this invention to provide such a system in which there is substantially no perceived loss of power during operator initiated vehicle accelerations or other sudden increases in vehicle engine load.

These objects are obtained in a spark timing control system for a spark ignited internal combustion engine which senses an engine tip-in event as a predetermined rate of change of an engine parameter indicating increasing inlet air pressure and, substantially immediately after sensing the tip-in event, temporarily retards spark timing from the normal engine spark timing by a predetermined crank angle sufficient to prevent tip-in knock and for a predetermined limited time period no greater than substantially 300 milliseconds from the beginning of the tip-in event, after which spark timing returns to its normal value. We have discovered that, although the additional spark retard necessary to prevent tip-in knock in some engines may be substantial, there will be substantially no perception of this retard in resulting loss of engine power by the vehicle operator provided that its duration is limited to a period no greater than 300 milliseconds.

Among the prior art patent references which disclose spark retard during vehicle accelerations or increases in engine load, only a few, such as the U.S. Pat. to Walker et al No. 4,054,110 and Barnes No. 3,007,987, discuss the duration of spark retard desired to eliminate knock and these references mention times ranging from three to ten seconds. Other prior art patent references, such as the U.S. Patents to Smitley No. 2,827,889, Udale No. 2,596,830, Udale No. 2,365,313, Colvin et al No. 2,557,527, Ludwig No. 3,828,743, Olson et al No. 2,384,692, Ludwig 3,935,843 and Grop No. 3,698,366, do not discuss the duration of retard required but either imply that it is to last throughout a majority of the acceleration period or show apparatus which appears to be incapable of providing the fast in and out retard action of this invention. Further details and advantages of this invention will be apparent from the accompanying drawings and following description of a preferred embodiment.

DESCRIPTION OF THE PREFERRED EMBODIMENT

Figure 1:
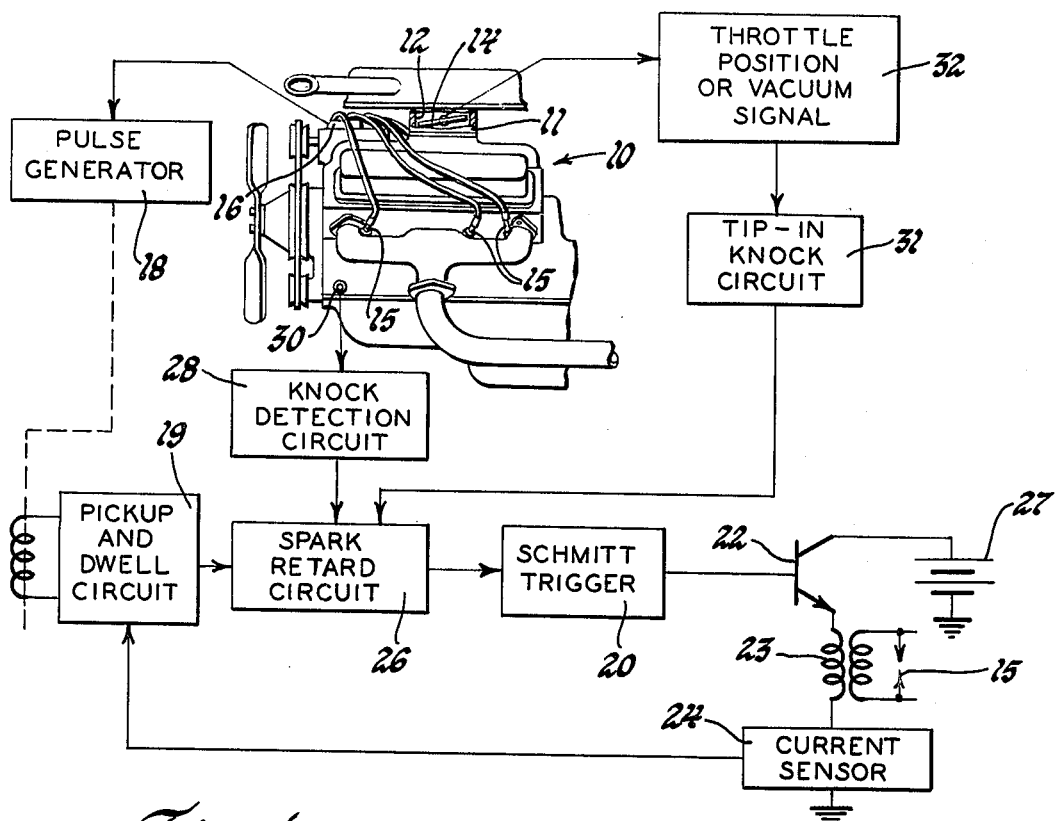
FIG. 1 shows an engine with a first embodiment of a spark timing control system according to this invention.

FIG. 1 shows a preferred embodiment of this invention in which the invention is combined with a closed loop knock control system. The system with which it is combined is substantially the same as the 1980 or 1981 production electronic spark control (ESC) system available on some vehicles produced by the assignee of this invention. It is further very similar to the system described in the U.S. Pat. to West No. 4,106,447 and West et al No. 4,111,035. Therefore, the description of the closed loop knock control portion of FIGS. 1 and 2 will be brief except where it differs from the systems shown in the aforementioned patents.

Referring to FIG. 1, internal combustion engine 10 includes air and fuel supply apparatus of any standard design which includes a carburetor or throttle body 11 defining an air inlet passage 12 including a throttle 14. Airflow to the engine 10 is controlled by throttle 14; and other apparatus, not shown, provides fuel to combine with the air to form a combustible fuel charge which is delivered to the cylinders of engine 10.

Engine 10 further includes an ignition system including spark plugs 15 effective to ignite the combustible mixture in the cylinders and means including a distributor 16 effective to generate and distribute high voltage pulses for the firing of spark plugs 15. The ignition system further includes a spark timing control in which a pulse generator 18, such as that described in U.S. Pat. No. 3,254,247 to Folgy, generates marker pulses substantially synchronously with engine rotation but with a normal spark timing relative to predetermined crankshaft rotational angles which may be programmed according to engine speed and manifold pressure in the standard manner.

The pulses from pulse generator 18 are provided to circuitry similar to that shown in the U.S. Pat. to Richards et al No. 3,828,672, which is summarized in FIG. 1 by pickup and dwell circuit 19, Schmitt trigger 20, switching transistor 22, spark coil 23 and current sensor 24. The pulses from pulse generator 18, which are actually in the form of an AC voltage wave, are suitably shaped into rectangular pulses in pickup and dwell circuit 19 and then applied to a spark retard circuit 26 such as that shown in the aforementioned West Pat. No. 4,106,447. The pulses are then passed to Schmitt trigger 20 to switch switching transistor 22, which controls the current flow from a DC power source 27 through the primary of spark coil 23 and current sensor 24. The sudden cutoff of current by switching transistor 22 at the end of a pulse causes a high voltage pulse in the secondary of spark coil 23 in the standard manner for application to spark plug 15. Current sensor 24 provides a feedback signal to pickup and dwell circuit 19 to control the dwell time of the pulses for optimum current buildup in the primary of spark coil 23.

Figure 3:
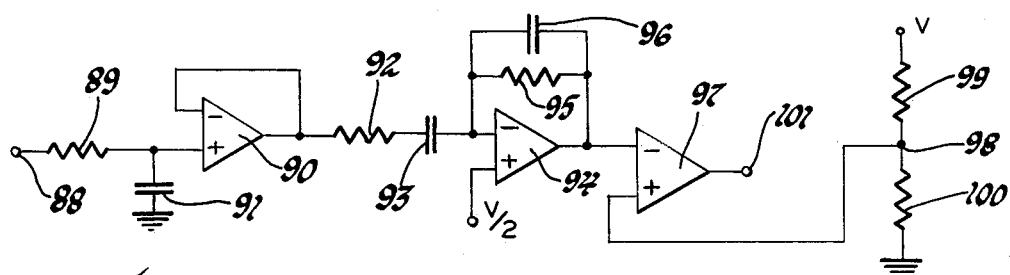
FIG. 3 shows a circuit diagram of additional circuitry for use with the circuit of FIG. 2 if a throttle position sensor is used in the spark timing control system of FIG. 1.

A knock detection circuit 28, similar to that shown in the aforementioned West et al Pat. No. 4,111,035, receives a signal from an engine mounted knock sensor 30 such as that shown in the U.S. Patent to Buck et al No. 4,161,665 or the U.S. Patent to Keem No. 4,254,354 and generates a knock control signal which is applied to spark retard circuit 26 to control the amount of retard, if any, given to the spark timing pulses. The signal from knock detection circuit 28 is combined with another knock control signal from a tip-in knock circuit 31 which can provide an additional retard to spark retard circuit 26. Tip-in knock circuit 31 receives a knock anticipating or tip-in signal from tip-in event sensing apparatus 32, which can be, for example, either a throttle position sensor for throttle 14 together with appropriate rate of change sensing circuitry or a differential vacuum switch sensitive to sudden changes in the pressure within air inlet passage 12. Throttle position sensors of the potentiometer type are well known in the prior art; and FIG. 3 shows a circuit, to be described at a later point in this application, for deriving the proper rate of change signalled from such a sensor. Vacuum or pressure differential switches are also well known in the prior art; but care must be taken in their application to this invention. As will be described in more detail at a later point in this application, the response time of such a device must be on the order of 70 milliseconds or less. Therefore, such devices must be designed with small diaphragm and chambers for fast response. It should be apparent to one skilled in the art of such devices how to construct or modify such a device for such a response time constraint. It has been done by employees of the assignee of this invention.

Figure 2:
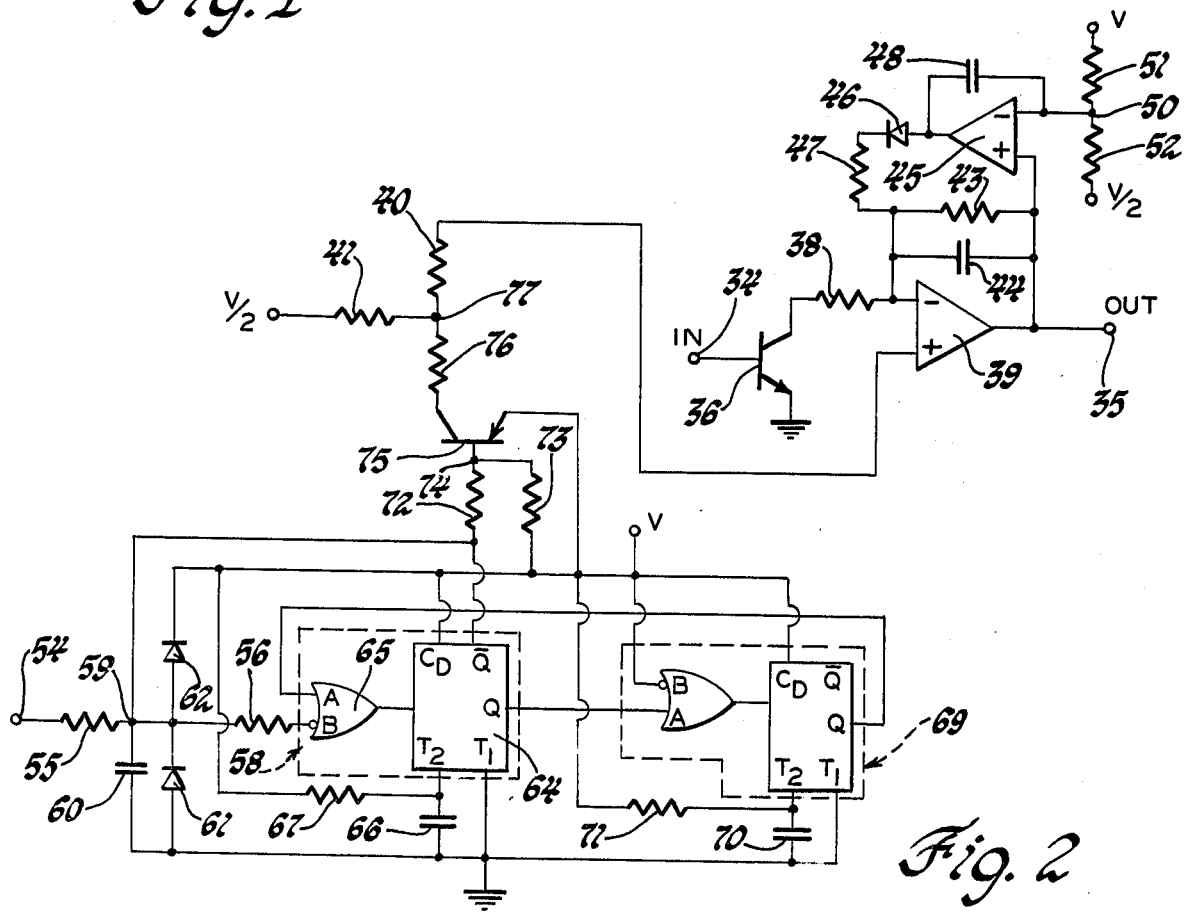
FIG. 2 shows a circuit diagram of a portion of the spark timing control system shown in FIG. 1.

The circuit of FIG. 2 includes the tip-in knock circuit 31 and a portion of knock detection circuit 28 showing the combination of the outputs of that circuit and tip-in knock circuit 31 in a preferred embodiment. Knock detection circuit 28, in response to signals from knock sensor 30, generates a series of pulses indicative of knock induced vibrations, the amplitude of which pulses are constant and the number and duration varying with the intensity of knock. These pulses are provided to an input terminal 34 and are integrated in a fast charge-slow discharge integrator into a knock control voltage provided at an output terminal 35 for application to spark retard circuit 26.

Specifically, input terminal 34 comprises the base of an NPN transistor 36 having a grounded emitter and a collector connected through a resistor 38 to the inverting input of an operational amplifier or op amp 39. Op amp 39 has a non-inverting input connected through series resistors 40 and 41 to a power supply at voltage V/2. It further has an output connected back through a parallel resistor 43 and capacitor 44 to the inverting input and to output terminal 35. Components 38–44 comprise the integrator which has a fast charge or ramp rate while transistor 36 is turned on and the input side of capacitor 44 is therefore grounded through resistor 38 and a slow discharge or ramp rate when transistor 36 is turned off and capacitor 44 discharges through resistor 43. Ordinarily, the integrator is provided with a reference voltage V/2 through resistors 40 and 41.

An op amp 45 has a non-inverting input connected to the output of op amp 39 and an output connected through a diode 46 and resistor 47 to the inverting input of op amp 39. It further has an inverting input connected through a feedback capacitor 48 to its output and further to the junction 50 of two series resistors 51 and 52 connected between the power supply at voltage V and the power supply at voltage V/2. These components comprise an upper voltage limiter on the output of the integrator op amp 39. The voltage divider comprising resistors 51 and 52 defines the limit voltage at junction 50; and if the voltage on the output of op amp 39 attempts to increase above this voltage, op amp 45 conducts to supply the charge current through the resistor 38 and transistor 36 to ground which replaces the current from capacitor 44 to prevent further charging of that capacitor and thus limit the output voltage at output terminal 35. This limiter is somewhat different from that described in the aforementioned West et al Pat. No. 4,111,035 in circuitry but performs essentially the same function in preventing the additional retard from retarding the spark timing to the point where crossfire might occur between two different cylinders of engine 10.

A tip-in or knock anticipating signal is provided from apparatus 32 to input terminal 54, which is connected through a resistor 55 and resistor 56 in series to tripper a retriggerable one shot 58. The junction 59 of resistors 55 and 56 is connected through a capacitor 60 and diode 61 in parallel to ground and through another diode 62 to the power supply at voltage V. The cathode of diode 61 and anode of diode 62 are connected to junction 59; and these diodes and capacitor 60 provide input transient protection for one shot 58.

Retriggerable one shot 58 is commercially available in a package of two; and each unit comprises a retriggerable one shot portion as shown at 64 and an input OR gate as shown at 65 with a non-inverting A input and an inverting B input. In retriggerable one shot 58, the B input is connected to resistor 56, a T1 input is grounded, a T2 input is connected to ground through a capacitor 66 and to power source V through a resistor 67, a CD input is connected to power source V and a not Q ($\overline{Q}$) output is connected to junction 59. The RC combination of resistor 67 and capacitor 66 determines the period of the one shot and has values chosen to provide a period between 175 and 300 milliseconds in this embodiment.

Retriggerable one shot 58 also has a Q output which is connected to the A input of a second retriggerable one shot 69. One shot 69 has B and CD inputs connected to power source V, a grounded T1 input, a T2 input connected through a capacitor 70 to ground and a resistor 71 power source V and a Q output connected back to the A input of one shot 58. The RC combination of capacitor 70 and resistor 71 is set for a period of about 1,000 milliseconds; and the purpose of the second retriggerable one shot 69 is to prevent the retriggering of the first retriggerable one shot 58 from the end of the period of the first one shot 58 to a time approximately 1,000 milliseconds after the beginning of the tip-in event to prevent multiple triggers of the system with resulting multiple spark retards from a single tip-in event by spurious signals due to contact bounce in the differential vacuum switch. It has been found that such signals may be produced by the switch, since it has contact bounce on both opening and closing, at times after 300 milliseconds from the beginning of the tip-in event but not after 1,000 milliseconds thereafter.

The not Q output of the first retriggerable one shot 58 is connected through a voltage divider comprising series resistors 72 and 73 to electric power source V. The junction 74 of resistor 72 and 73 is connected to the base of a PNP transistor 75 having an emitter connected to power source V and a collector connected through a resistor 76 to junction 77 of resistors 40 and 41.

In operation, the not Q output of retriggerable one shot 58 is ordinarily high, which holds transistor 75 off and isolates the tip-in portion of the circuit from the portion of the circuit included in knock detection circuit 28. Thus, voltage V/2 is provided to the noninverting input of op amp 39 through resistors 40 and 41. When retriggerable one shot 58 is triggered, however, the not Q output goes low and turns on transistor 75 so that the non-inverting input of op amp 39 is now connected through resistor 40 to junction 77 and from there through resistor 41 to voltage V/2 and through resistor 76 and transistor 75 to voltage V. The result is an immediate step in the voltage seen by the noninverting input of op amp 39 from voltage V/2 to a higher voltage between V/2 and V, which causes the output voltage at output terminal 35 to jump by the same voltage subject to the voltage limitation determined by the voltage at junction 50. The increase in voltage seen at the noninverting input of op amp 39 is set by the selection of resistors 40, 41 and 76 to be that required to produce the desired supplemental retard sufficient to prevent the occurrence of the tip-in knock. When the period of retriggerable one shot 58 ends, the not Q input again goes high and the output voltage at output terminal 35 steps back by the same amount. Retriggerable one shot 69 continues to prevent retriggering of one shot 58 for the full 1,000 millisecond period from its initial trigger.

Figure 7:
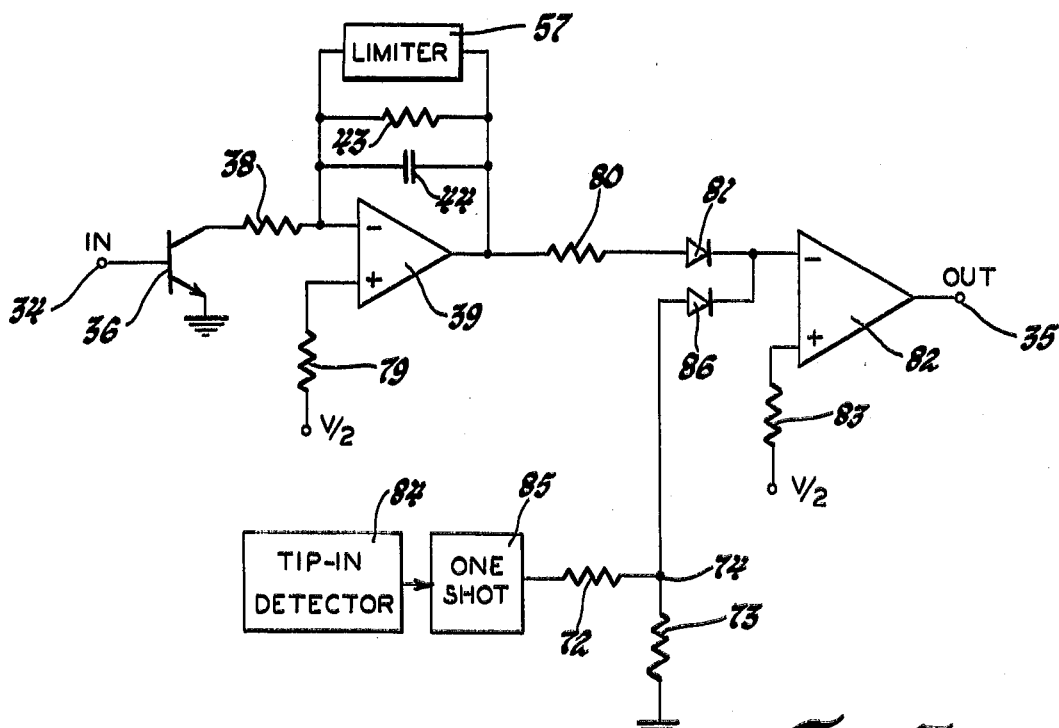
FIG. 7 shows an embodiment of this invention as it was first reduced to practice.

The advantage of the method of interconnection of the tip-in and closed loop knock circuits as shown in FIG. 2 can be seen with reference to the circuit of FIG. 7, which represents the initial operating embodiment of this invention. The circuit of FIG. 7 includes input terminal 34, transistor 36, resistor 38, op amp 39, resistor 43 and capacitor 44, which are identical to those elements in the circuit of FIG. 2. Resistor 79 of FIG. 7 is equal to the series combination of resistor 40 and 41 in FIG. 2. The output of op amp 39 is connected through a resistor 80 and diode 81 to the inverting input of an op amp 82 having a noninverting input connected through a resistor 83 to power supply V/2 and an output connected to output terminal 35. A tip-in detector 84 corresponds to apparatus 32; and it triggers a one shot 85, which corresponds to elements 54–71 of FIG. 2. Resistors 72 and 73 with junction 74 correspond to the like numbered elements of FIG. 2; but in FIG. 7 they are connected between the output of one shot 85 and ground. Junction 74 is connected through a diode 86 to the inverting input of op amp 82.

In FIG. 7, the closed loop and tip-in knock retard outputs are connected through diodes 81 and 86 to an amplifier 82 in a "highest wins" configuration. Op amp 39 is understood to have the voltage limiting apparatus of FIG. 2, here numbered 57. Since some additional retard is desired from the tip-in circuit even when the closed loop knock retard has caused the spark timing to near its crossfire limit the tip-in retard voltage at junction 74 determined by resistor 72 and 73 is set to the maximum limiting voltage of the closed loop system. There are, however, two problems with this configuration. The first is that the temperature dependence of the voltage across diodes 81 and 86, while perhaps of no great consequence in a constant temperature laboratory environment, may be too great for the extremes of ambient temperature in a real world automobile environment. Variation in the voltage across diodes 81 or 86 would produce a variation in the retard. The other objection is that the retard required by some engines to prevent tip-in knock is substantially less than the maximum retard corresponding to the voltage at junction 74 and the limit of the voltage at the output of op amp 39. With such engines, if the greater retard limit voltage is used, there may be a very slightly perceptable loss of power due to the action of the tip-in circuit. It is thus desirable to provide no more retard measured in crank angle than required for a particular engine to eliminate the tip-in knock; and this is impractical with the circuit of FIG. 7. However, the circuit of FIG. 2 has neither of these objections, since it does not include the diodes 81 and 86 and is an additive retard circuit wherein the retard due to the tip-in circuit need not be any greater than necessary and yet the sum of that retard plus the retard of the closed loop circuit is still limited to prevent crossfire.

The circuit of FIG. 3 is used with a throttle position potentiometer to sense the rate of increase of throttle opening and generate an output signal when that rate exceeds a predetermined reference. An input terminal 88 is connected through a resistor to the non-inverting input of an op amp 90 and also through resistor 89 and a capacitor 91 to ground. Op amp 90 has an output connected to its inverting input and also through a resistor 92 and capacitor 93 to the inverting input of an op amp 94. Op amp 94 has a non-inverting input connected to power supply V/2 and an output connected back to the inverting input through a parallel combination of resistor 95 and capacitor 96 and further to the inverting input of an op amp 97. Op amp 97 has a noninverting input connected to the junction 98 of a pair of resistors 99 and 100 connected between power supply V and ground and further has an output connected to an output terminal 101.

In the circuit of FIG. 3, input terminal 88 is connected to the output of the throttle position sensor; and the combination of resistor 89 and capacitor 91 forms a noise reducing low pass filter. Op amp 90 is a voltage follower buffer which is connected through the differentiating circuit of resistor 92 and capacitor 93 to op amp 94. The output of op amp 94, which represents the derivative of the input signal and therefore the rate of change of throttle position, is compared with a reference determined at junction 98 by resistors 99 and 100 and causes a change in output of comparator 97 only when it exceeds that reference in the positive direction.

Figure 4:
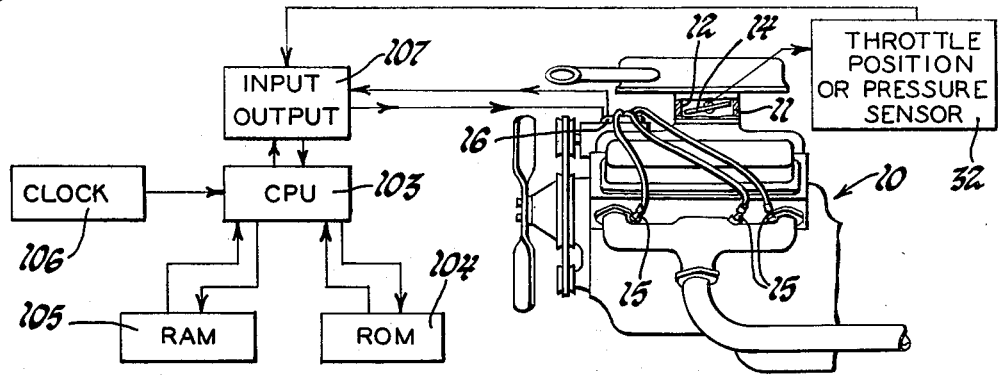
FIG. 4 shows an engine with a second embodiment of this invention.

FIG. 4 shows an embodiment of this invention useful with an engine having a digital computer controlling its spark timing. Engine 10 of FIG. 4 is substantially the same as the similarly numbered engine of FIG. 1 in its inclusion a carburetor or throttle body 11 defining an air inlet passage 12 with a throttle 14 and further having spark plugs 15 and distributor 16. Tip-in event sensing apparatus 32 is similar to that of FIG. 1 and may comprise a throttle position sensor or vacuum/pressure differential switch. A digital computer comprises a central processing unit (CPU) 103, read only memory (ROM) 104, random access memory (RAM) 105, clock 106 and input-output circuit 107. Input-output circuit 107 is connected to receive inputs such as crankshaft synchronized voltage pulses produced by the pulse generator 18 of FIG. 1 and from which can be determined engine speed, the output of tip-in sensing apparatus 32 and other sensed engine parameters, not shown. It is also connected to provide spark timing pulses to a Schmitt trigger such as Schmitt trigger 20 in FIG. 1 which may trigger the appropriate spark generating circuitry as shown and described with reference to FIG. 1. A predetermined engine controlling program is stored in ROM 104 to dictate control of the engine by CPU 103 at a clock rate determined by clock 106 in the manner well known to those familiar with digital computers. Although there are many varieties of computing apparatus that could be used for the elements shown in FIG. 4, the Motorola 6800 series of elements is particularly well suited for this function.

Assuming that the details of computer controlled spark timing are well known to those in the art, since such systems are available on production vehicles at this time, only the modification or addition to that program according to the teachings of this invention will be described below.

Figure 5:
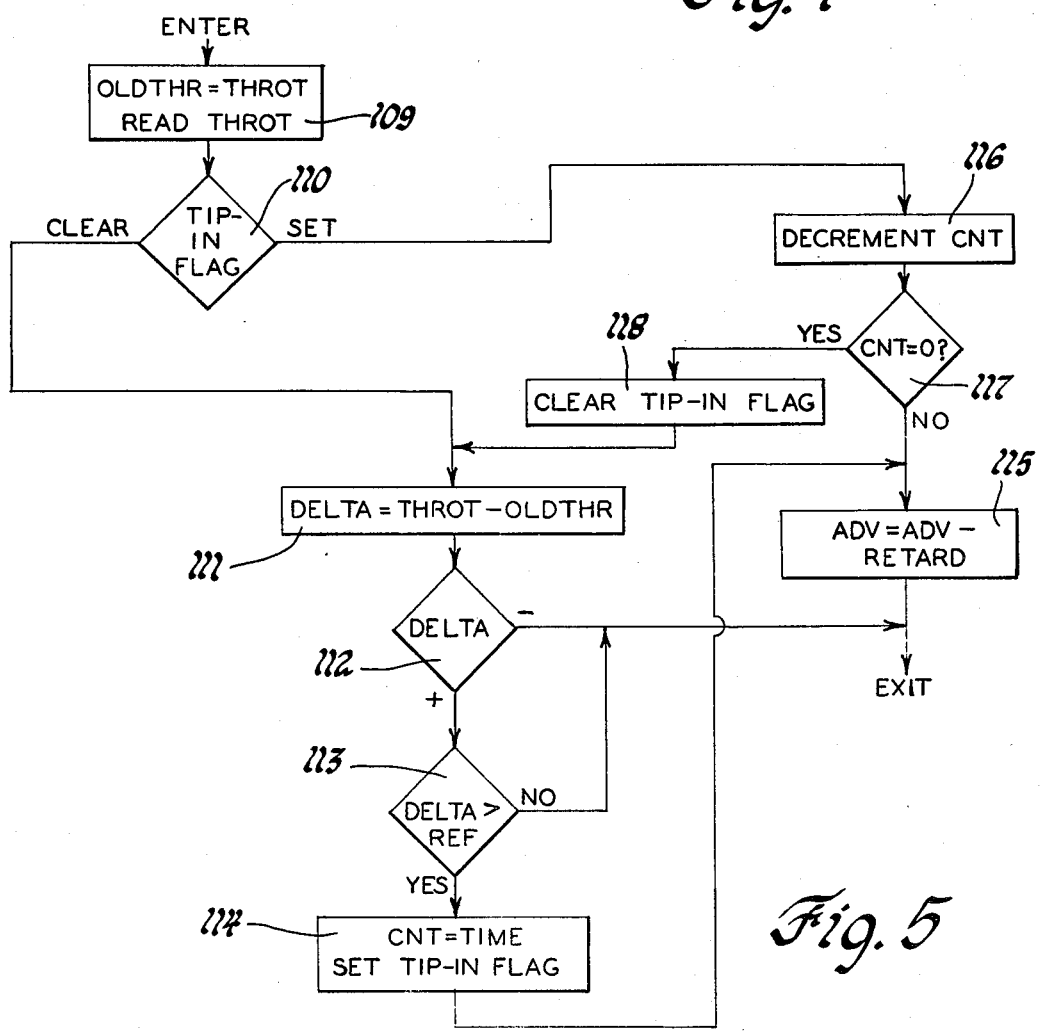
FIG. 5 shows a computer flow chart describing the operation of the spark timing control system of FIG. 4.

The flow chart of FIG. 5 assumes that there is already in existence a number in a register of RAM 105 which represents a desired spark timing ffor the next spark event of engine 10 in the absence of an engine tip-in event, which number will be signified by the name ADV. The flow chart of FIG. 5 further assumes that apparatus 32 comprises a throttle position sensing potentiometer, the output of which is provided to input-output circuit 107, in which it is sampled and converted from analog to digital form. The first block 109 of FIG. 5 calls for storing the last sampled throttle position input THROT in a memory location OLDTHR and reading a new sample of THROT. Next, decision point 110 determines whether a tip-in flag is set or clear. If it is clear, step 111 computes the change in throttle position DELTA according to the equation DELTA=-THROT−OLDTHR. Decision point 112 next causes an exit from this portion of the program if DELTA is negative. If DELTA is positive, however, decision point 113 next causes an exit from this portion of the program if DELTA is not greater than a reference REF. Since the clock 106 causes the CPU to run its program at a constant recycle rate, DELTA has been calculated with reference to a constant time duration and is thus an indication of an average rate of throttle change during that time duration. Thus, if DELTA is both positive and greater than reference REF, then the rate of change of throttle opening is greater than a reference and the program next proceeds to step 114 in which a memory location CNT in RAM 105 is loaded with a number TIME from ROM 104 and the tip-in flag is set. This constitutes the beginning of a retard period; so that program next proceeds to step 115 in which the normally computed spark timing ADV is retarded according to the equation ADV=ADV−RETARD, where RETARD is the number stored in ROM 104 which will produce the desired tip-in retard. This portion of the program is then exited.

Returning to decision point 110, if the tip-in flag is set, the program proceeds to step 116 in which the number CNT is decremented by one and then to decision point 117, which sends the program to step 115 if the number CNT is not yet equal to 0. This will occur on each computer cycle until the number CNT is decremented to 0; and the total time for the number CNT of computer cycles is equal to the desired time of retard which is no greater than 300 milliseconds. At the end of this period, decision point 117 will determine that the number CNT is equal to 0 and the program will thus proceed to step 118 in which the tip-in flag is cleared and then to step 111 for a new computation of DELTA. It should be apparent that, if it is desired to prevent a repeat for a predetermined period after a tip-in retard, another count loop and flag could be inserted in the flow chart. This and other modifications could be easily performed by a competent programmer.

At another point in the program stored in ROM 104, the spark timing number ADV is provided to input-output circuit 107 and converted by means of an output counter or similar device triggered by a synchronizing pulse from a pulse generated synchronized with crankshaft rotation to provide a spark generating pulse through distributor 16 to the correct spark plug 15. It is felt that it would be a simple task for a competent programmer to modify an existing program in ROM 104 according to the flow chart of FIG. 5.

Figure 6:
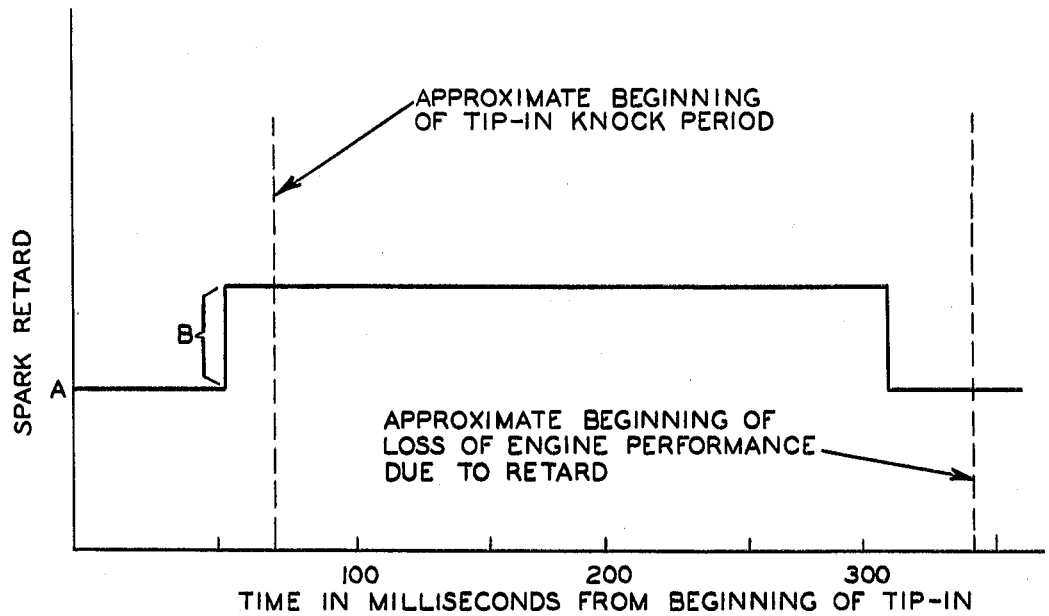
FIG. 6 is a plot of spark retard versus time from beginning of a tip-in event, which plot is useful in understanding the operation of the spark timing control system of FIGS. 1 and 4.

FIG. 6 shows a plot of spark retard versus time for the spark timing system of this invention in any of its embodiments assuming a normal spark timing denoted as A and an additional retard B due to the tip-in knock circuit, whether limited or not. Beginning with the initiation of a throttle opening movement at time zero, audible tip-in knock may first occur at a time approximately 70 milliseconds thereafter. Thus, the sensing apparatus 32 must generate a signal and cause an actual spark retard prior to this time. The designer must take all time lags into account, including those associated with the sensing of a throttle movement or pressure difference over time, delays associated with circuitry and those associated with computer operating cycles. The throttle position sensor provides faster sensing than the differential vacuum or pressure switch, although the latter can be made fast enough if required. The time after the initiation of the throttle opening movement at which a loss of performance or power is first noticeable to the vehicle operator varies with the engine, transmission and other characteristics of the vehicle and also with the amount of retard B. However, in most cases, such noticeable loss of power begins to occur some time after 300 milliseconds from the initiation of the throttle opening or tip-in event. Since different types of sensing apparatus take different amounts of time to produce a signal indicative of the tip-in event but it is desired to state the invention in a manner which does not depend upon the type of such apparatus used, the claims hereinafter are stated in terms of the generation of a knock anticipating signal and a period measured from the beginning of that signal. It is to be understood that the time is defined from the beginning of the throttle movement or tip-in event regardless of the amount of time required by the apparatus to complete its signal generating function.

It has been further found that, on those engines tested so far, a practical lower limit for the end of the retard is 175 milliseconds. If the retard is ended sooner than this, there is a good chance that audible tip-in knock may occur. Actually, most engines appear to perform best with a period of about 200–250 milliseconds.

It has also been found that there exist a few engines that have a very great tendency to knock and that the application of this invention in its purest form to such engines, although it may eliminate the knock technically known as tip-in knock, will nevertheless allow some audible knock when the spark timing advances in a step at the end of the retard period until the closed loop system can react and control it. For such an engine, it may be necessary, if audibly objectionable knock is to be totally eliminated, to move the spark timing back toward its more advanced position at a slower rate, so as to permit trace knock to activate the closed loop system rather than jumping directly into a hard, loud knock. There may be a slight loss of performance associated with the holding of some retard past the 300 millisecond period; however, it will not be much, if at all, greater than that caused by the retard of the closed loop system. Such as application, within reason, is therefore still through to be within the scope of this invention, as long as the open loop retard begins to revert within the claimed period and the system shifts to closed loop control as soon as practical thereafter.

Selected component values for the circuit of FIG. 2 are as follows:
one shots 58, 59-14538
op amps 39, 45-LM2902
transistor 36-2N4401
capacitor 48-22
capacitor 44-4.7 uF
capacitor 60-0.01 uF
capacitor 66, 70-2.7 uF TAN
resistor 55-1 K
resistor 56-47 K
resistor 67-75.0 K, 1%
resistor 51-29.4 K, 1%
resistor 52-20 K, 1%
resistor 47-470
resistor 43-487 K
resistor 38-22 K
resistor 40-475 K, 1%
resistor 41-13.3 K, 1%
resistor 76-37.4 K, 1%
resistor 72-20 K
resistor 73-10 K
resistor 71-374 K, 1%

The embodiments of the invention in which an exclusive property or privilege is claimed are defined as follows:

1. A spark timing control system for a spark ignited, multi-cylinder internal combustion engine subject to knock-induced vibrations and having means effective to normally generate spark events with a predetermined spark timing in relation to crankshaft rotational position, the engine further having an air inlet passage characterized by an inlet air pressure, an abrupt increase in which anticipates a knocking event of limited duration, the system comprising, in combination:

means responsive to a predetermined rate of change of an engine parameter indicating increasing inlet air pressure associated with a sudden throttle opening event to generate a knock anticipating signal; and means responsive to said signal to temporarily retard spark timing from said predetermined spark timing by a predetermined crank angle and for a predetermined limited time period of fixed duration, the period ending substantially between 175 and 300 milliseconds after the beginning of said sudden throttle opening event, whereby operator perception of such retarded spark timing in engine performance is substantially nonexistent.

2. A spark timing control system for a spark ignited, multi-cylinder internal combustion engine subject to knock-induced vibrations and having means effective to normally generate spark events with a predetermined spark timing in relation to crankshaft rotational position, the engine further having an air inlet passage characterized by an inlet air pressure, an abrupt increase in which anticipates a knocking event of limited duration, the system comprising, in combination;

means responsive to a predetermined rate of change of an engine parameter indicating increasing inlet air pressure associated with a sudden throttle opening event to generate a knock anticipating signal; and means responsive to said signal to temporarily retard spark timing from said predetermined spark timing by a predetermined crank angle and for a predetermined limited time period of fixed duration, the period beginning no more than 70 milliseconds and ending substantially between 175 and 300 milliseconds after the beginning of said sudden throttle opening event, whereby operator perception of such retarded spark timing in engine performance is substantially nonexistent.

* * * * *